US011736953B2

(12) United States Patent
Imanilov et al.

(10) Patent No.: US 11,736,953 B2
(45) Date of Patent: Aug. 22, 2023

(54) ANTENNA ARRAY SHARING IN A MULTI-OPERATOR RADIO NODE IN A COMMUNICATION SYSTEM

(71) Applicant: CORNING RESEARCH & DEVELOPMENT CORPORATION, Corning, NY (US)

(72) Inventors: Benjamin Imanilov, Hod HaSharon (IL); Andrey Kobyakov, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 826 days.

(21) Appl. No.: 16/587,990

(22) Filed: Sep. 30, 2019

(65) Prior Publication Data
US 2021/0099890 A1    Apr. 1, 2021

(51) Int. Cl.
*H04W 16/18* (2009.01)
*H04W 16/28* (2009.01)
*H04B 7/0452* (2017.01)
*H04W 88/08* (2009.01)

(52) U.S. Cl.
CPC ........... *H04W 16/18* (2013.01); *H04W 16/28* (2013.01); *H04B 7/0452* (2013.01); *H04W 88/08* (2013.01)

(58) Field of Classification Search
CPC ..... H04W 16/18; H04W 16/28; H04W 88/08; H04B 7/0452; H04B 7/0408; H04B 7/0617
See application file for complete search history.

(56) References Cited

U.S. PATENT DOCUMENTS 10,075,852 B2    9/2018  Nekovee
2003/0052828 A1*  3/2003  Scherzer ................. H01Q 5/42
                                                                343/795

(Continued)

FOREIGN PATENT DOCUMENTS

WO    2018/186967 A1    10/2018

OTHER PUBLICATIONS

U.S. Appl. No. 62/882,309 of US 2021/0037447 A1. (Year: 2019).*

(Continued)

*Primary Examiner* — Margaret G Mastrodonato
(74) *Attorney, Agent, or Firm* — William D. Doyle

(57) ABSTRACT

A multi-operator radio node for a communication system that supports sharing a common antenna array while supporting multiple service providers. The multi-operator radio node includes signal processing circuits for each supported service provider. Each signal processing circuit is configured to receive communication signals for a supported service provider to be distributed through a common antenna array to wireless client devices. Each signal processing circuit includes a modem that processes the received communication signals for spectrum of its service provider to provide signal streams to be distributed to co-located antenna elements in the antenna array. Summation circuits are provided at the front end of each RF chain circuit to combine signal streams of the spectrum of the service providers directed to the same antenna element in the antenna array to form signal beams in individual frequencies of the service providers.

20 Claims, 13 Drawing Sheets

(56) References Cited

U.S. PATENT DOCUMENTS

| | | | | |
|---|---|---|---|---|
| 2004/0252055 | A1* | 12/2004 | Thomas | H01Q 1/246 342/372 |
| 2012/0071184 | A1* | 3/2012 | Lin | H04W 88/10 455/507 |
| 2014/0010149 | A1* | 1/2014 | Cook | H04B 7/0404 370/328 |
| 2014/0307610 | A1* | 10/2014 | Rudrapatna | H04B 7/024 370/312 |
| 2014/0362688 | A1* | 12/2014 | Zhang | H04L 41/0816 370/230 |
| 2016/0164587 | A1* | 6/2016 | Pu | H04B 7/0617 370/328 |
| 2017/0229774 | A1* | 8/2017 | Schuehler | H04B 7/0617 |
| 2018/0277151 | A1 | 9/2018 | Matsuo et al. | |
| 2018/0295639 | A1 | 10/2018 | Bhushan et al. | |
| 2018/0331731 | A1 | 11/2018 | Boudreau et al. | |
| 2019/0020407 | A1* | 1/2019 | Gharavi | H04B 7/15 |
| 2020/0107285 | A1* | 4/2020 | Prakash | H04L 1/0018 |
| 2021/0037447 | A1* | 2/2021 | Tarighat Mehrabani | H04W 40/248 |

OTHER PUBLICATIONS

Shokri-Ghadikolaei et al; "The Impact of Beamforming and Coordination on Spectrum Pooling in mmWAVE Cellular Networks", 50th Asilomar Conference on Signals, Systems and Computers, 2016, 6 Pages.
Anchora et al; "Resource Allocation and Management in Multi-Operator Cellular Networks with Shared Physical Resources"; IEEE, (2012) pp. 296-300.
Artiga et al; "Shared Access Satelite-Terrestrial Reconfigurable Backhaul Network Enabled by Smart Antennas at mmWAVE Band"; IEEE Network (2018); pp. 46-53.
Aydin et al; "Energy-Spectral Efficiency Tradeoffs in 5G Multi-Operator Networks with Heterogeneous Constraints"; IEEE Transactions on Wireless Communications; vol. 16, No. 9 (2017) pp. 5869-5881.
Badia et al; "A Tunable Framework for Performance Evaluation of Spectrum Sharing in LTE Networks"; IEEE (2013); 3 Pages.
Ellingson et al; "The LWA1 Radio Telescope"; IEEE Transactions on Antennas and Propagation; vol. 61, No. 5 (2013); pp. 2540-2549.
Fund et al; "Resource Sharing Among mmWAVE Cellular Service Providers in a Vertically Differentiated Duopoly" ; IEEE IOC (2017); 7 Pages.
Gomes et al; "Optical Fronthaul Options for Meeting 5G Requirements"; IEEE (2018); pp. 1-4.
Gozalves; "Fifth-Generation Technologies Trials"; IEEE Vehicular Technology Magazine (2016) pp. 5-13.
Gupta et al; "On the Feasibility of Sharing Spectrum Licenses in mmWAVE Cellular Systems"; IEEE Transactions on Communications, vol. 64, No. 9; (2016); pp. 3981-3995.
Hiltunen et al; "Performance of Neighboring Indoor 5G Micro Operators with Dynamic TDD"; IEEE (2018) pp. 59-64.
Hiltunen et al; "Propagation Model for Evaluating the Interference Between Neighboring Indoor Micro Operators" ; IEEE (2018); 6 Pages.
Huang et al; "High-Speed Wireless Applications"; Wiley; (2008) pp. 255-271.
Jurdi et al; "A Model for Infrastructure Sharing in mmWAVE Cellular Networks"; IEEE, 2018; 6 Pages.
Jurdi et al; "Modeling Infrastructure Sharing in mmWAVE Networks with Shared Spectrum Licenses" ; IEEE Transactions on Cognitive Communications and Networking, vol. 4, No. 2 (2018) pp. 328-343.
Kant et al; "Embrace: A Multi-Beam 20,000-Element Radio Astronomical Phased Array Antenna Demonstrator"; IEEE Transactions on Antennas and Propagation, vol. 59., No. 6 (2011); pp. 1990-2003.
Manosha et al; "Framework for Spectrum Authorization Elements and its Application to 5G Micro-Operators"; IEEE (2017); 8 Pages.
Mueck et al; "Licensed Shared Access for mmWAVE Cellular Broadband Communications"; IEEE; 2014; 5 Pages.
Naik et al; "Coexistence of Wireless Technologies in the 5 GHz Bands: A Survey of Existing Solutions and a Roadmap for Future Research"; IEEE Communication Surveys & Tutorials, vol. 20, No. 3, (2018) pp. 1777-1798.
Olvera et al; "Numerical Analysis of Reconfigurable Plasma Antenna Arrays"; IEEE, (2015) 5 Pages.
Rebato et al; "Resource Sharing in 5G mmWAVE Cellular Networks"; IEEE; (2016); 6 Pages.
Saha et al; "Bandwidth Partitioning and Downlink Analysis in Millimeter Wave Integrated Access and Backhaul for 5G"; IEEE Transactions on Wireless Communications; vol. 17, No. 12, (2018) pp. 8195-8210.
Shokri-Ghadikolaei et al; "Spectrum Sharing in mmWAVE Cellular Networks Via Cell Association, Coordination, and Beamforming"; IEEE Journal on Selected Areas in Communications, vol. 34, No. 11 (2016) pp. 2902-2917.
Shokri-Ghadikolaei et al; "The Impact of Beamforming and Coordination on Spectrum Pooling in mmWAVE Cellular Networks"; IEEE (2016) 6 Pages.
Zhang et al; "Optimal and Suboptimal Beamforming for Multi-Operator Two-Way Relaying with a MIMO Amplify-and-Forward Relay" ; IEEE (2012); 5 Pages.
Zhang et al; "Sum Rate Maximization in Multi-Operator Two-Way Relay Networks with a MIMO AF Relay Via POTDC"; EUSIPCO; (2013) pp. 1-5.

\* cited by examiner

ANTENNA ARRAY SHARING IN A MULTI-OPERATOR RADIO NODE IN A COMMUNICATION SYSTEM

BACKGROUND

The disclosure relates generally to antenna array sharing in a multi-operator radio node in a communication system, such as a macrocell radio, a small cell radio, remote radio heads (RRHs), etc., as examples. Such massive antenna array sharing allows such a communication system to support multiple operators with limited antenna arrays.

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communication systems have been provided to transmit and/or distribute communication signals to wireless devices called "clients," "client devices," or "wireless client devices," which must reside within the wireless range or "cell coverage area" to communicate with an access point device. Example applications where communication systems can be used to provide or enhance coverage for wireless services include public safety, cellular telephony, wireless local access networks (LANs), location tracking, and medical telemetry inside buildings and over campuses. One approach to deploying a communication system involves the use of a radio node/base station that transmits communication signals distributed over a physical communication medium to one or more remote units forming radio frequency (RF) antenna coverage areas, also referred to as "antenna coverage areas." The remote units each contain or are configured to couple to one or more antennas configured to support the desired frequency(ies) of the radio node to provide the antenna coverage areas. For example, the advent of 5G cellular protocols means that the desired frequencies are generally between 30 GigaHertz (GHz) and 300 GHz (i.e., millimeter wave range). At these frequencies, radio nodes may include antenna arrays that can produce dynamically steerable radiation patterns in the form of narrow beams. While beamforming has specifically been proposed at the millimeter wave range, some proposals have seen its use at lower frequencies (e.g., 3.5 GHz) more traditionally associated with older, non-beamforming technologies. Antenna coverage areas can have a radius in the range from a few meters up to twenty meters, as an example. Another example of a communication system includes radio nodes, such as base stations, that form cell radio access networks, wherein the radio nodes are configured to transmit communication signals wirelessly directly to client devices without being distributed through intermediate remote units.

For example, FIG. 1A is an example of a communication system 100 that includes a plurality of radio nodes, only one radio node 102 shown, where each radio node is configured to support one or more service providers $SP_1$-$SP_N$, 104(1)-104(N) as signal sources (also known as "carriers," "cellular operators" (CO) or "service operators"—e.g., mobile network operator (MNO)) and wireless client devices 106(1)-106(W). For example, the radio node 102 can be a component of a distributed communication system (DCS) such as a distributed antenna system (DAS) that is configured to provide communication signal streams 108(1)-108(S) from the radio node 102 to the wireless client devices 106(1)-106(W) based on a downlink communication signal 110(1)-110(N) received from the service providers 104(1)-104(N). As another example, the radio node 102 may be a base station (eNodeB) that includes modem functionality. The communication signal streams 108(1)-108(S) are radiated through antennas 112 to the wireless client devices 106(1)-106(W) in communication range of the antennas 112. As another example, the radio node 102 in the communication system 100 in FIG. 1A can be a small cell radio access node ("small cell"), radio unit, front-end unit, front end node, or the like. Traditionally small cells serve only a single service provider (e.g., just service provider 104(1)). However, emerging technologies in small cell deployment allow a small cell radio access node such as radio node 102 to support multiple service providers 104(1)-104(N) by providing communication signal streams 108(1)-108(S) for the multiple service providers 104(1)-104(N) through plural antenna arrays. The communication signal streams 108(1)-108(S) are based on respective communication signals 110(1)-110(N) received from respective evolved packet core (EPC) networks $CN_1$-$CN_N$ of the service provider 104(1)-104(N) through interface connections.

Massive Antenna Arrays (MAAs) were introduced to enhance performance, in general, and typically serve a single service provider 104(1)-104(N). MAAs enhance performance by enabling techniques such as multi-user (MU) multiple-input, multiple-output (MIMO) (MU-MIMO) and beamforming. A MAA includes a plurality of antenna elements that can support a number of users, support aggregated data rate, and increase the spectral efficiency with reduced interference. In small cells, radio units, front end units, radio nodes, or front end nodes that serve multiple service providers 104(1)-104(N), a MAA can be provided for each service provider 104(1)-104(N) supported in a communication system. The communication system 100 can also be configured to support beamfoming with a single MAA shared by multiple supported service providers 104(1)-104(N). For example, each of the antennas 112 in the communication system 100 in FIG. 1A can be a MAA 114 as shown in FIG. 1B. A MAA 114 contains a plurality of antenna elements 116(1)-116(E), for example sixty-four (64) antenna elements. Beamforming or spatial de-multiplexing is a signal processing technique used in wireless communication for directional signal transmission and/or reception. This is achieved by combining antenna elements in an antenna array in a way that signals at particular angles experience constructive interference while others experience destructive interference. For example, the front end of 5G radio nodes, especially at frequencies above 2.5 GHz, and more particularly above 6 GHz, may include a MAA and supporting RF processing circuit elements. Beamforming techniques can be used at both the transmitting and receiving ends to achieve spatial selectivity although it should be appreciated that panels used in transmitting are not the same panels used for receiving, because each antenna element of a panel and the supporting hardware will not be designed to transmit and receive simultaneously.

In the communication system 100 in FIG. 1A, the size and number of antenna elements 116(1)-116(E) in the MAA 114 depend on the frequencies and spatial isolation to be supported by a site operator circuit 118 in the radio node 102. The site operator circuit 118 in FIG. 1A is configured to create multiple signal beams ("beams") 120(1)-120(N) for the communication signal streams 108(1)-108(S) that are orthogonal and spatially isolated from each other to serve multiple wireless client devices 106(1)-106(W) essentially simultaneously. For example, the multiple beams 120(1)-120(N) may support MIMO communication. The radio node 102 and MAA 114 are designed to support a maximum number of simultaneous beams 120(1)-120(M). In fully digital designs, the number of antenna elements 116(1)-116(E) in the MAA 114 dictates, in part, the maximum number of supported beams 120(1)-120(M) and shape of each and every beam. Additional limitations may derive from a number of Digital to Analog (DAC) convertors for Hybrid architecture. The analog beamforming is defined by a single DAC, therefore can transmit only a single beam according to a codeword that describes phase shifter states and optional analog amplitude control.

It should be appreciated that the above description is generally applicable to an analog beamforming system with single beam capability as for fully digital and hybrid systems with multiple beam capabilities. The present disclosure provides for each operator single beam service in the case of an analog beamforming building block and multiple beams for each operator according to the number of supported beams by fully digital or hybrid building blocks. The capacity supported by the radio node 102 is split between the multiple service providers 104(1)-104(N). Beamforming can also be used to focus the beams 120(1)-120(M) to achieve increased communication range with increased signal quality by reducing interference that results from spatial isolation with other beams 120(1)-120(M).

An exemplary shared radio node 102 is illustrated in FIG. 2. In particular, six service providers 104(1)-104(6) (also referred to as operators I-VI) communicate with the radio node 102, sending respective data streams 200(1)-200(6) (generically data stream 200) and beam switch trigger signals 202(1)-202(6) (generically beam switch trigger signal 202) to the radio node 102. As alluded to above, the radio node 102 may be an end unit, radio remote unit, or distributed unit in a DCS. Each data stream 200 and beam switch trigger signal 202 pair is provided to a respective control circuit 204(1)-204(6) which controls a respective antenna panel 206(1)-206(6) (each of which may be a MAA 114). Each antenna panel 206(1)-206(6) forms a respective beam pattern 208(1)-208(N) that covers a service area in which wireless client devices 106 (FIG. 1A) can be found. Note that the respective service areas overlap to allow the different service providers 104(1)-104(N) to communicate with their subscribers.

The communication system 100 in FIG. 1A that supports multiple service providers 104(1)-104(N) and beamforming may be deployed in a building environment 300 as shown in FIG. 3. The capacity of the communication system 100 can be increased and multiplied by the number of simultaneous beams 120(1)-120(N) provided with sufficient isolation. MAAs, especially for the sub 6 GHz frequency range, might capture a significant area. For example, a MAA for the 3.5 GHz band may typically include thirty-two (32) to sixty-four (64) antenna elements with or without cross polarization arrangement at typical sizes of 13.4"×6.7" and either 13.4"× 13.4" or 26.8"×6.7", respectively.

A drawback of using MAAs can be the complexity, size, and cost of the antenna array and related electronic circuitry as well as higher power consumption. For example, a more detailed view of a single control circuit 204 is shown in FIG. 4. Thus, as illustrated in FIG. 4, if a conventional fully digital beamforming arrangement is employed in the radio node 102 of the communication system 100 in FIG. 1A, every antenna element 116(1)-116(E) in the MAA 114 is coupled to a separate RF chain circuit 400(1)-400(E) that includes a dedicated downlink digital-to-analog (D/A) converter 402(1)-402(E), a downlink power RF amplifier circuit 404(1)-404(E), uplink analog-to-digital (A/D) converter 406(1)-406(E), an uplink RF amplifier circuit 408(1)-408(E) (e.g., a low noise amplifier (LNA)), a downlink transmitter circuit 410(1)-410(E), and an uplink receiver circuit 412(1)-412(E). In the case of a fully digital architecture with a sixty-four (64) antenna element MAA 114, sixty-four (64) separate RF chain circuits 400(1)-400(E) must be provided, adding size and cost.

No admission is made that any reference cited herein constitutes prior art. Applicant expressly reserves the right to challenge the accuracy and pertinency of any cited documents.

SUMMARY

Embodiments disclosed herein include antenna array sharing in a multi-operator radio node in a communication system. In particular, a radio node may include two antenna arrays while providing support for multiple operators that are not necessarily synchronized with each other. Signals from the multiple operators (also referred to herein as service providers) arrive at the radio node through respective input ports where they are processed and directed through switches to one of the two antenna arrays. Together, the two antenna arrays are capable of producing a full set of directed beams that provides wireless communication service to a defined service area. However, individually, one antenna array provides only a partial subset of the directed beams. Thus, the control system uses a second set of switches to control which beam serves a particular portion of the service area in which a destination wireless device is to be found. By combining signals in this fashion and splitting responsibility for the service area between the two antenna arrays, the overall circuitry requirement for transmission is reduced to two antenna arrays and two transmitter circuits. Likewise, the overall circuitry requirement for receiving is reduced to two antenna arrays and two receiver circuits. Still further, the beams so formed may be more tightly formed for better compliance with rigorous wireless protocol requirements.

One exemplary embodiment of the disclosure relates to a node for providing wireless communication services for a plurality of service providers to a service area with a defined set of beam signals. The node comprises a plurality of input communication ports configured to receive communication signals from the plurality of service providers. The node also comprises a first antenna panel, a second antenna panel, and a control circuit. The control circuit is coupled to the plurality of input communication ports, the first antenna panel, and the second antenna panel. The control circuit is configured to instruct the first antenna panel to generate a first partial subset of beam signals of the defined set of beam signals. The control circuit is also configured to instruct the second antenna panel to generate a second partial subset of beam signals of the defined set of beam signals. The second partial subset of beam signals does not include beam signals from the first partial subset of beam signals. The control circuit is also configured to arbitrate which of the communication signals from the plurality of service providers are transmitted through the first partial subset of beam signals and which of others of the communication signals from the plurality of service providers are transmitted through the second partial subset of beam signals.

An additional exemplary embodiment of the disclosure relates to a method for controlling a node for providing wireless communication services for a plurality of service providers to a service area with a defined set of beam signals. The method comprises instructing a first antenna panel to generate a first partial subset of beam signals of the defined set of beam signals. The method also comprises instructing a second antenna panel to generate a second partial subset of beam signals of the defined set of beam signals. The second partial subset of beam signals does not include beam signals from the first partial subset of beam signals. The method also comprises arbitrating which of communication signals from the plurality of service providers are transmitted through the first partial subset of beam signals and which of others of the communication signals from the plurality of service providers are transmitted through the second partial subset of beam signals.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments disclosed herein include antenna array sharing in a multi-operator radio node in a communication system. In particular, a radio node may include two antenna arrays while providing support for multiple operators that are not necessarily synchronized with each other. Signals from the multiple operators (also referred to herein as service providers) arrive at the radio node through respective input ports where they are processed and directed through switches to one of the two antenna arrays. Together, the two antenna arrays are capable of producing a full set of directed beams that provides wireless communication service to a defined service area. However, individually, one antenna array provides only a partial subset of the directed beams. Thus, the control system uses a second set of switches to control which beam serves a particular portion of the service area in which a destination wireless device is to be found. By combining signals in this fashion and splitting responsibility for the service area between the two antenna arrays, the overall circuitry requirement for transmission is reduced to two antenna arrays and two transmitter circuits. Likewise, the overall circuitry requirement for receiving is reduced to two antenna arrays and two receiver circuits. Still further, the beams so formed may be more tightly formed for better compliance with rigorous wireless protocol requirements.

Figure 5A:
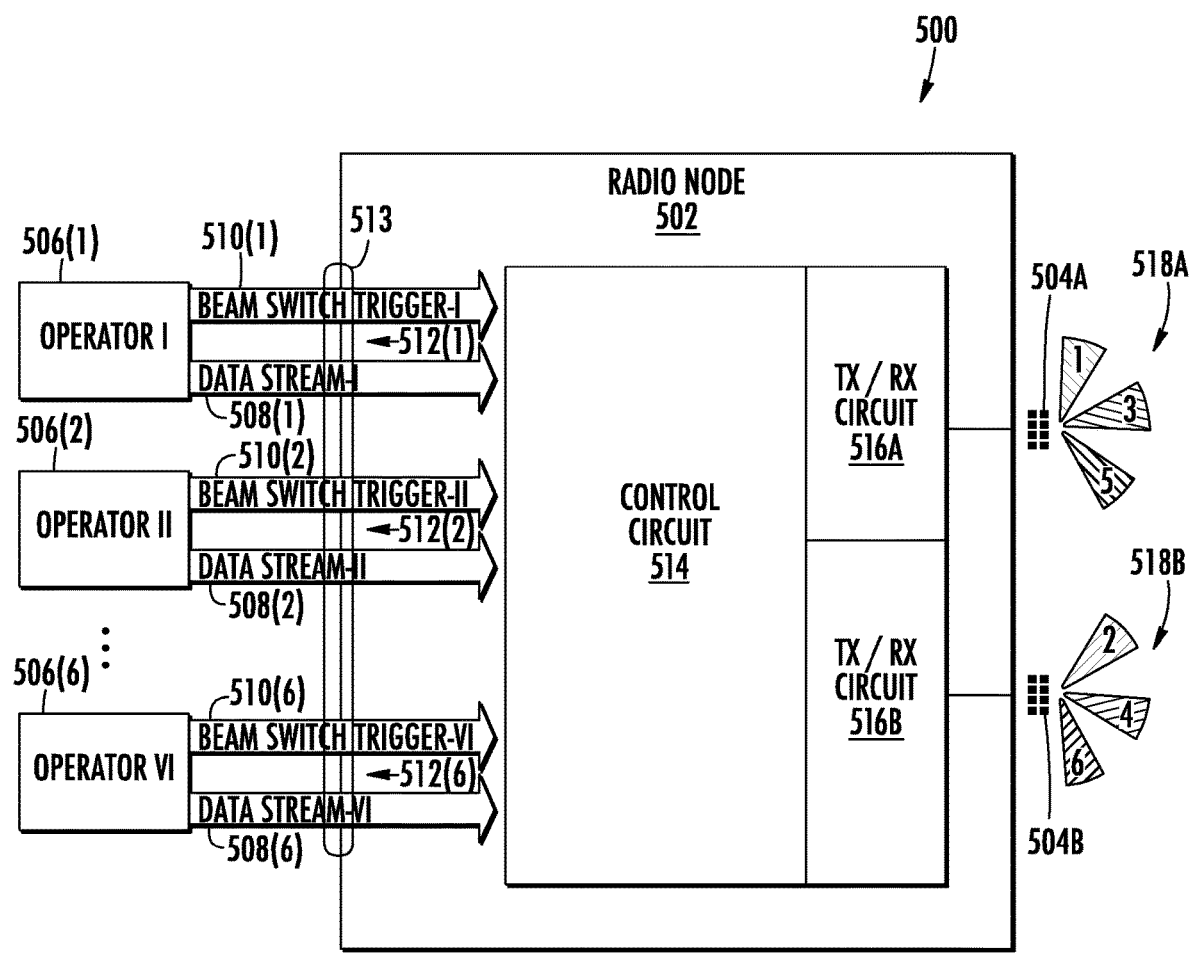
FIG. 5A is a schematic diagram of an exemplary communication system that includes a multi-operator radio node having two shared antenna arrays that both serve all the operators by providing only selected beams from each of the antenna arrays such that full coverage is still supplied without needing a full transmit circuit for each operator.

In this regard, FIG. 5A is a transmission side schematic diagram of an exemplary communication system 500 that includes a multi-operator radio node 502 coupled to two common antenna panels 504A and 504B, both of which may be a massive antenna array (MAA). A MAA is an antenna that includes a large number of antenna elements (e.g., 64 or more). The multi-operator radio node 502 is a circuit that includes radio frequency (RF) front end signal processing circuits and at least a portion of the stack layer of base stations (e.g., eNodeBs, gNodeBs) for the multiple service providers supported. In the communication system 500 in FIG. 5A, six service providers 506(1)-506(6) (also referred to as operators I-VI) communicate with the radio node 502, sending respective data streams 508(1)-508(6) (generically data stream 508) and beam switch trigger signals 510(1)-510(6) (generically beam switch trigger signal 510) to the radio node 502. The beam switch trigger signals 510(1)-510(6) may have instructions for the radio node 502 as to which beam and frequency are to be used to allow a given wireless device (e.g., a cell phone) in the general service area of the radio node 502 to communicate with the network of the respective service provider 506(1)-506(6). That is, a wireless device may tell a service provider of a preferred beam index learned during downlink transmission of Synchronization Signal Blocks (SSB) of all the beams that cover an area or according to a downlink Channel State Information Reference Signal (CSI-RS). Also a base station can learn, at what beam index, a signal from a cell phone could be received better according to reception of an uplink Sounding Reference Signal (SRS). Armed with this information, the service providers 506(1)-506(6) "know" the general positions of wireless devices registered with the service provider 506(1)-506(6) with sufficient particularity to assign particular beams, frequencies, and time slots at which the wireless devices operate according to the wireless protocol (e.g., 5G). Thus, the service provider 506(1)-506(6) is in a position to provide that information to the radio node 502 in the beam switch trigger signals 510(1)-510(6).

With continued reference to FIG. 5A, the radio node 502 receives the data streams 508(1)-508(6) and beam switch trigger signals 510(1)-510(6) at respective input communication ports 512(1)-512(6) in an input interface 513. The input communication ports 512(1)-512(6) are coupled to a control circuit 514. The control circuit 514 is coupled to the antenna panels 504A and 504B through respective transmitter circuits 516A and 516B. While the present discussion focuses on the transmissions from the radio node 502, it should be appreciated that comparable circuitry and antenna panels (not shown) may be provided to handle received signals.

Figure 1A:
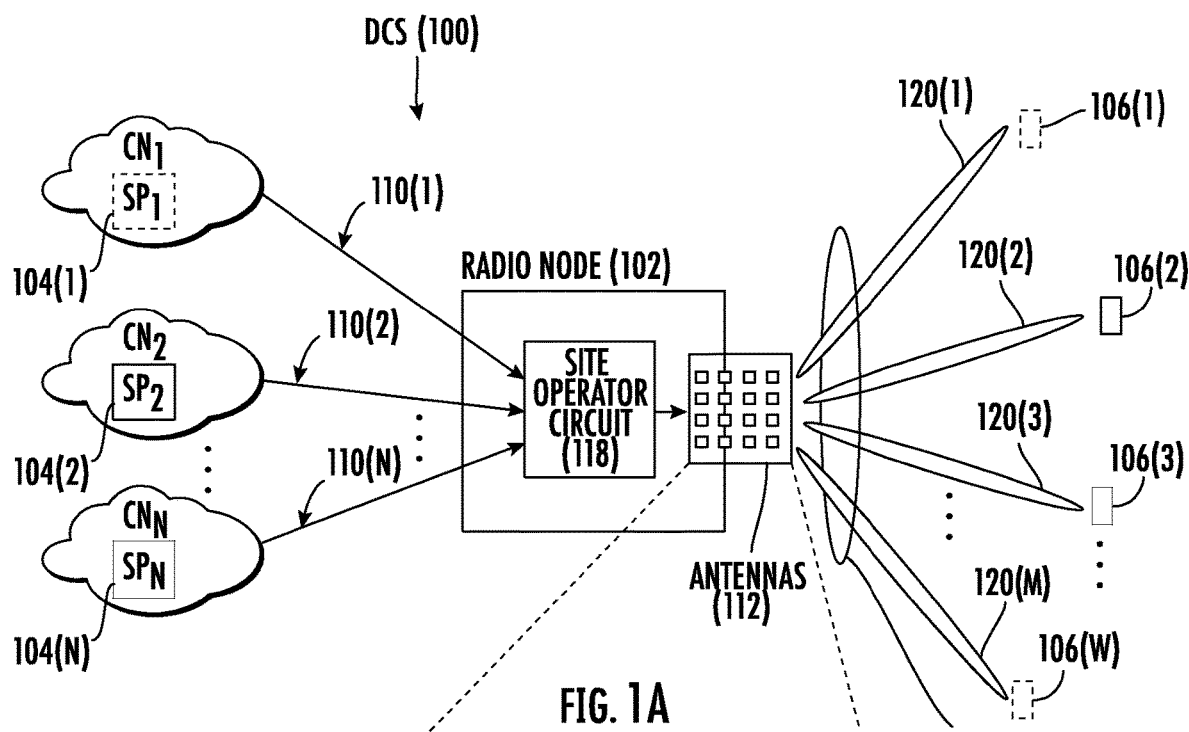
FIG. 1A is a schematic diagram of an exemplary communication system that includes a conventional multi-operator radio node that includes a massive antenna array (MAA) to support distribution of communication signals for multiple service providers.
Figure 1B:
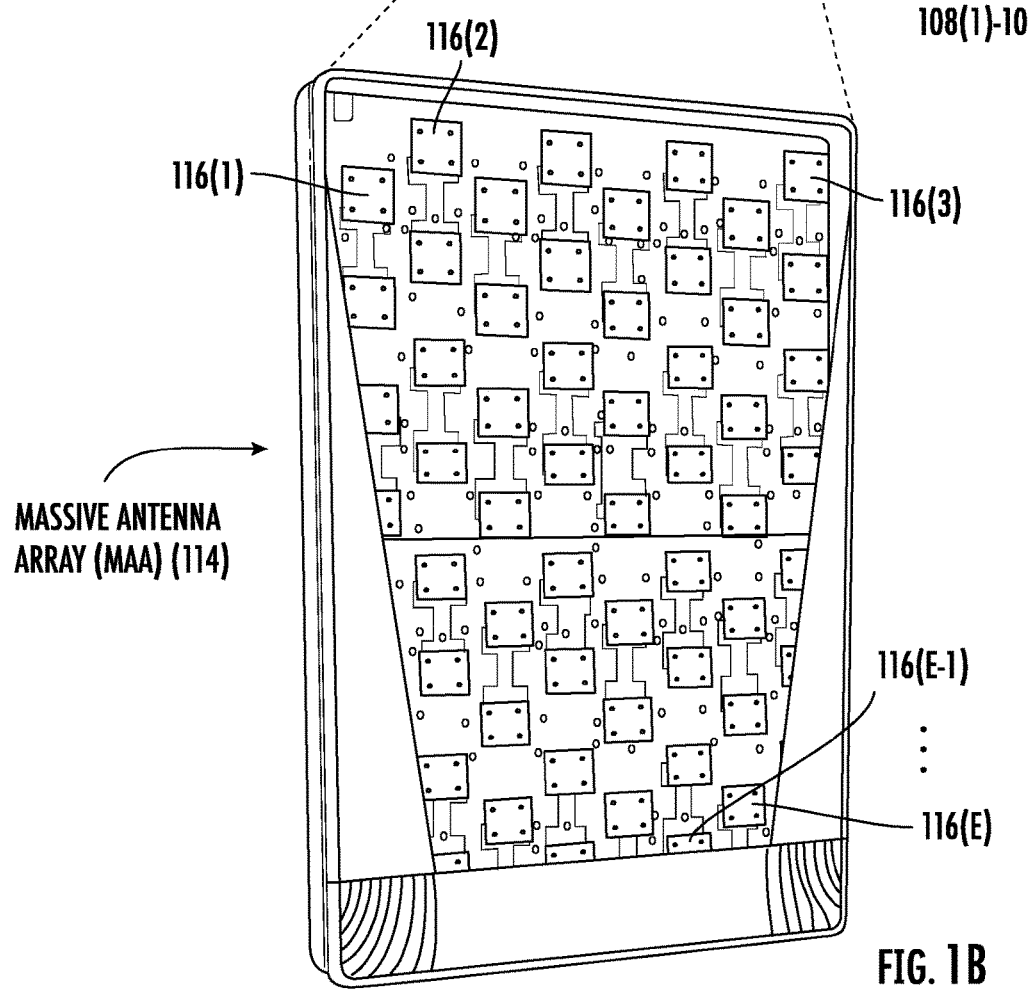
FIG. 1B is an example of the MAA for the multi-operator radio node in FIG. 1A.
Figure 2:
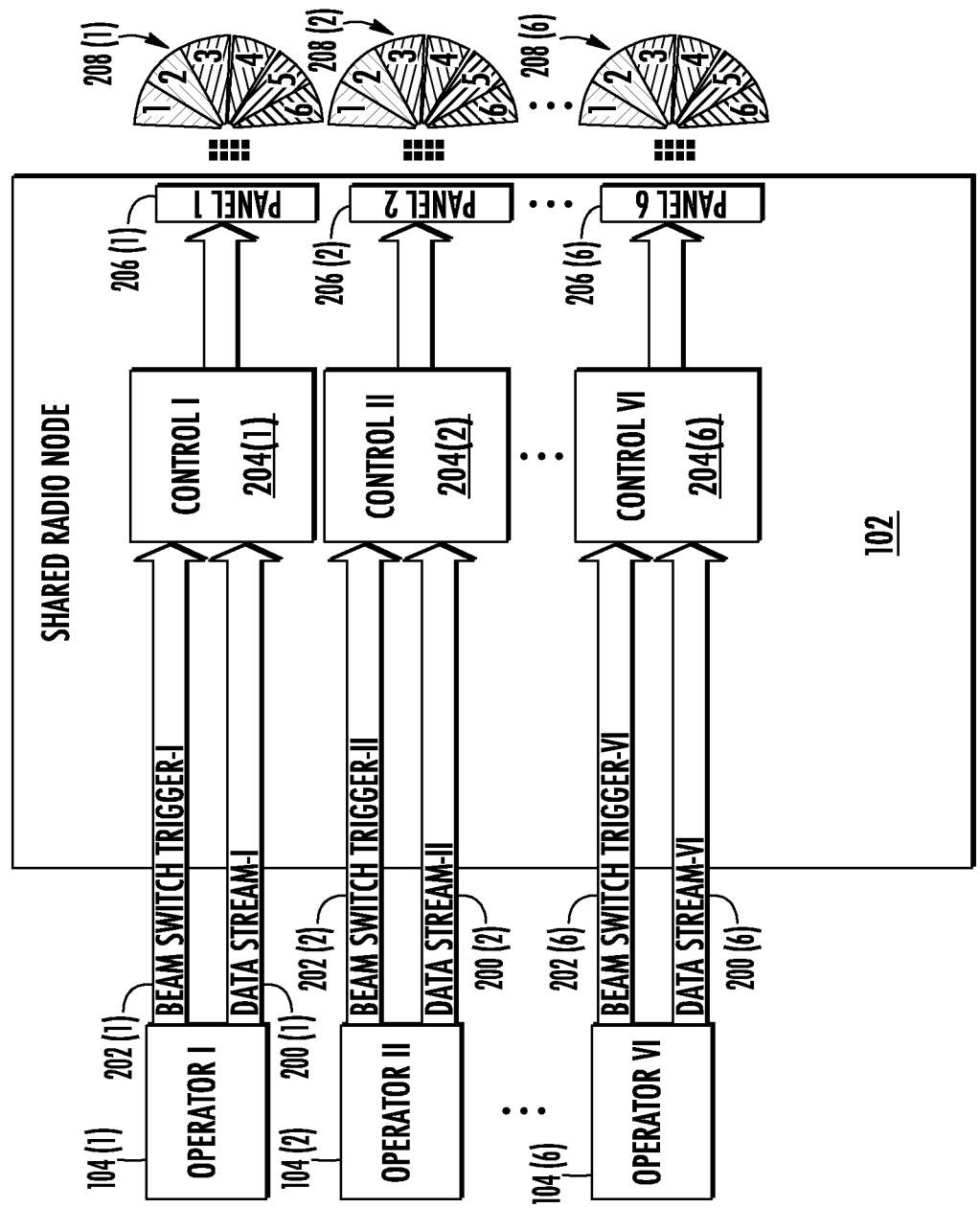
FIG. 2 is a simplified schematic diagram of a multi-operator radio node with dedicated control systems and antenna panels corresponding one to one with each of the multiple operators.
Figure 3:
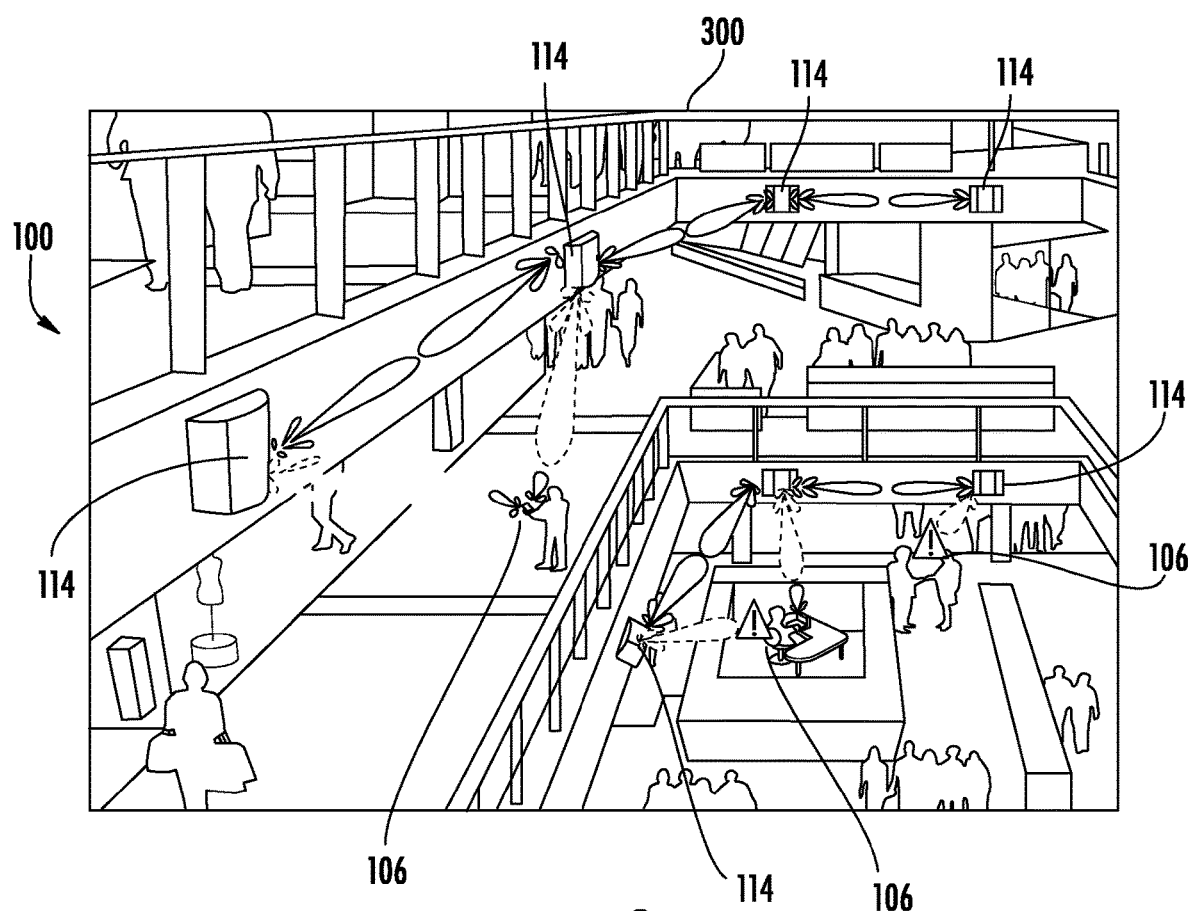
FIG. 3 is an example of a building environment where MAAs are deployed and configured to radiate multiple beams to wireless client devices within the building environment.
Figure 4:
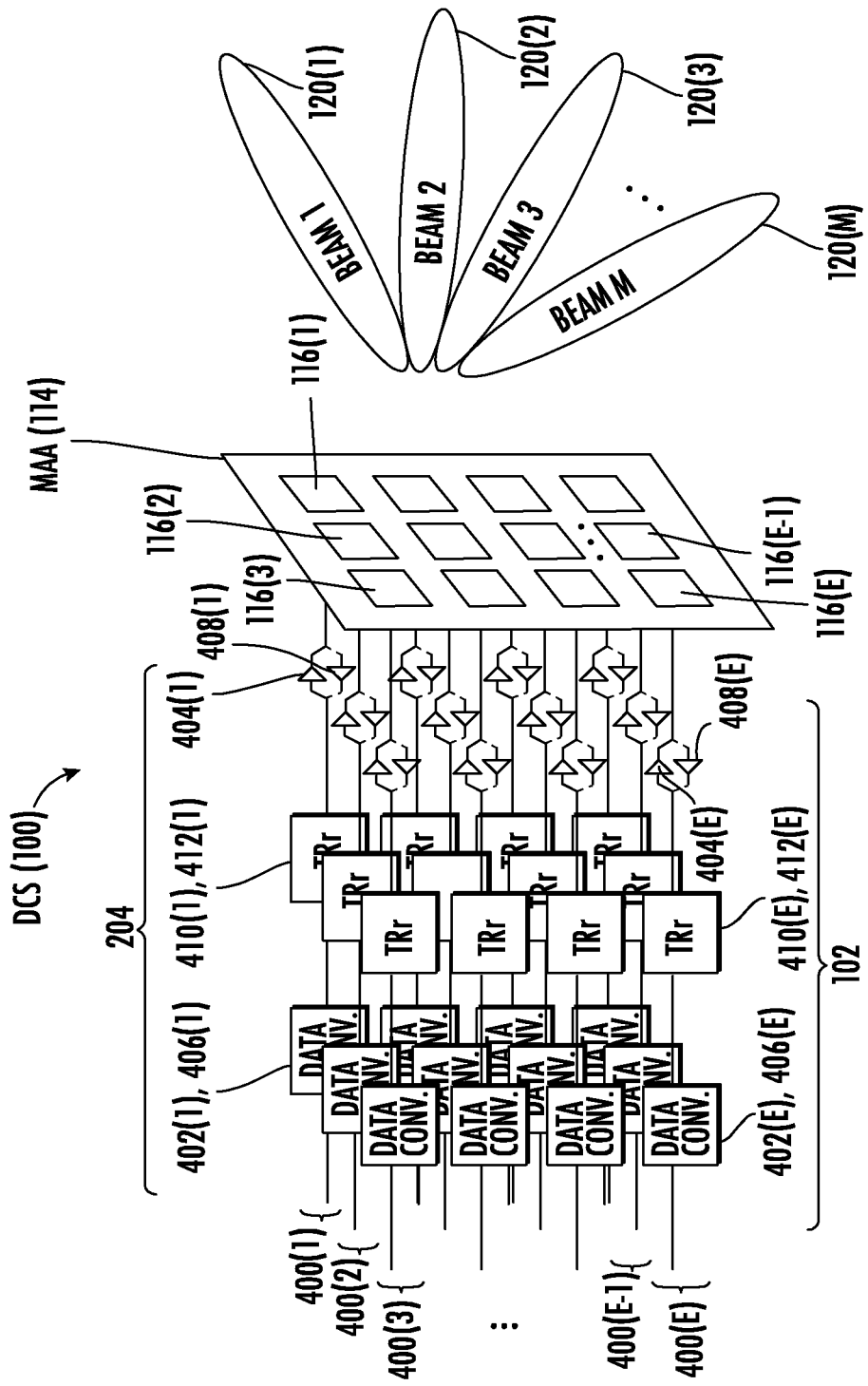
FIG. 4 is an example of digital beamforming circuitry that can be employed in the radio node in the communication system in FIG. 1A to support digital beamforming communication signals for multiple service providers.

With continued reference to FIG. 5A, the radio node 502 may be an end unit, radio remote unit, or distributed unit in a distributed communication system (DCS) such as the communication system 100 of FIG. 1A. The antenna panels 504A and 504B may be a MAA. Unlike the antenna panels 206(1)-206(6) of FIG. 2 that produce full beam patterns, the antenna panels 504A and 504B produce a respective partial subset of beam signals 518A and 518B that is less than the full beam pattern. It should further be appreciated that the first partial subset of beam signals 518A produced by the first antenna panel 504A is not included in the second partial subset of beam signals 518B produced by the second antenna panel 504B (and vice versa—the second partial subset of beam signals 518B produced by the second antenna panel 504B is not included in the first partial subset of beam signals 518A produced by the first antenna panel 504A). As illustrated, the full beam set includes six beams. (but it should be appreciated that this number is arbitrary and merely used for illustration), and each partial subset of beam signals 518A, 518B includes three beams. However, the sum of the first partial subset of beam signals 518A and the second partial subset of beam signals 518B is equal to the full beam pattern.

By splitting the full beam pattern between the two antenna panels 504A and 504B, full coverage is still provided, but the physical requirements for providing a full beam pattern is relaxed in that a given antenna panel does not have to provide beams that are spatially divergent. For the sake of illustration only, it is assumed that the full coverage area spans a 180 degree arc (with the understanding that this is not simply an arc in two dimensions because all beams exist in three dimensions). Thus, there may be an arc in each of the principal directions (e.g., azimuthal and elevational). In such a hypothetical situation, it is, as a function of the physical laws, challenging to form beams 1 and 6 (using the beam signal numbers as illustrated) with nice clean beams. Rather, if a single antenna panel such as antenna panel 206(1) of FIG. 2 has to form both beams 1 and 6, the resulting beam has side lobes which may interfere with adjacent beams and has a lower gain value than central beams 3-4. Even if the full coverage area spans a mere 120 degree arc, it remains challenging to form beams 1 and 6. Thus, by limiting the number of beams that a given antenna panel 504A, 504B has to produce, the quality of beams is improved.

The control circuit 514 arbitrates when communication signals from the plurality of service providers 506(1)-506(6) are transmitted through the beams of the first antenna panel 504A and the beams of the second antenna panel 504B. That is, the service providers 506(1)-506(6) may indicate which beam is required and at what frequency, but the control circuit 514 effectively controls the various signals so that all the signals are able to be transmitted through just the two antenna panels 504A, 504B rather than each service provider requiring a dedicated antenna panel such as in the radio node 102 of FIG. 2. By eliminating the requirement that each service provider have its own antenna panel, the overall circuitry requirement for the radio node 502 is also reduced relative to the radio node 102. Note further that the radio node 502 scales to more than six service providers without requiring any additional antenna panels. While such scaling may require a software upgrade for the control circuit 514, there is no hardware upgrade requirement, which eliminates potentially expensive labor costs. To the extent that a given antenna panel may provide more than a single beam at a given instant in time, it may be possible to accommodate service providers that require more than one beam.

Figure 5B:
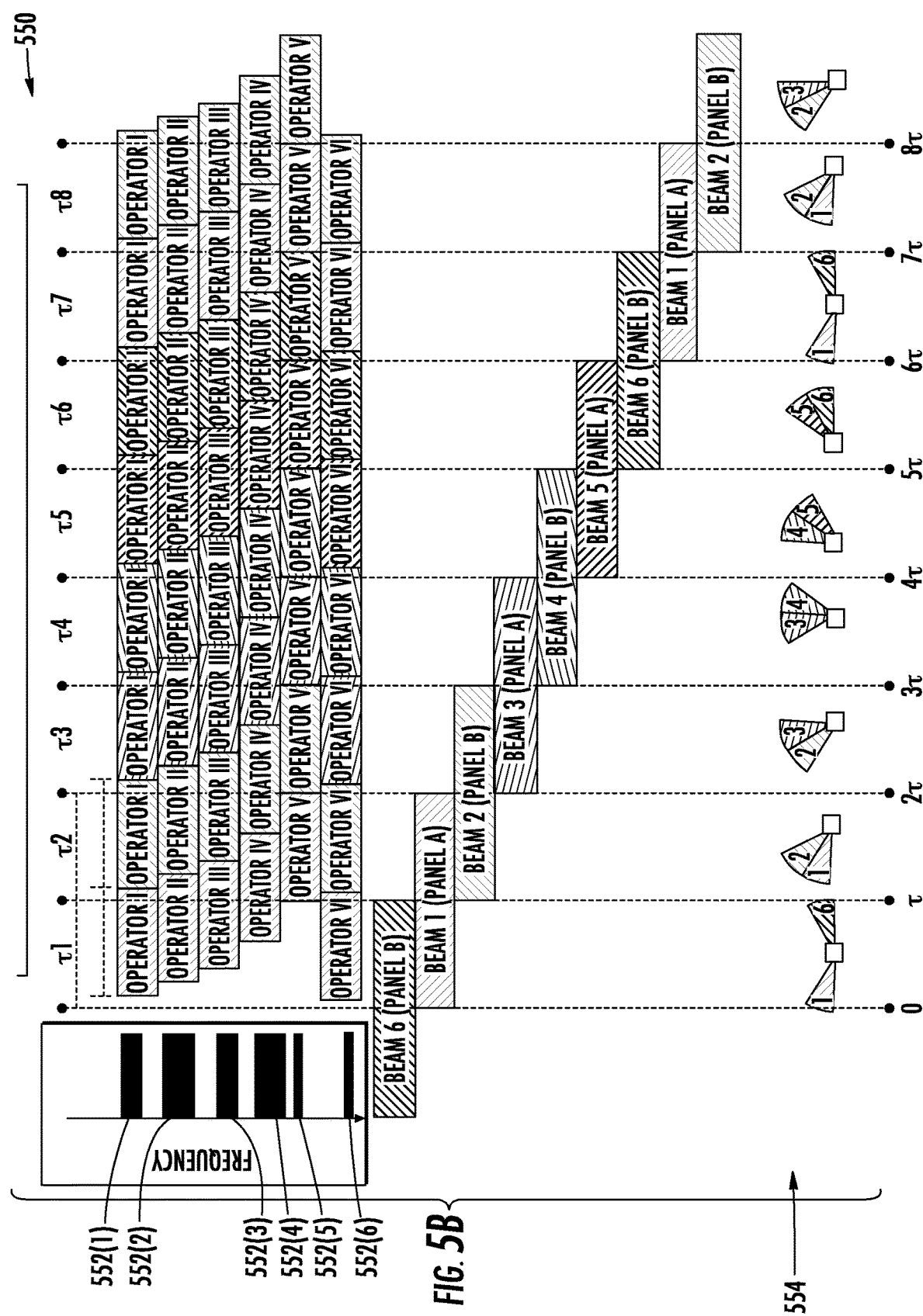
FIG. 5B is a stylized time diagram showing how multiple operators use the paired antenna arrays of FIG. 5A to provide full coverage.

To assist in understanding the arbitration of the control circuit 514, FIG. 5B shows an exemplary time diagram 550 that shows a beam usage based on hypothetical signals from the service providers 506(1)-506(6). It should be appreciated that the service providers 506(1)-506(6) are not synchronized relative to one another. For the sake of example, it is assumed that the service providers 506(1)-506(6) are operating on different frequencies 552(1)-552(6) and operate sequentially through different beams. That is, the first service provider 506(1) uses beam 1, beam 2, beam 3, etc. The other service providers 506(2)-506(6) likewise step through the beams, but are not synchronized with the first service provider 506(1) or each other. However, the control circuit 514 can determine a window τ, corresponding to a required beam duration, in which two beams may be active and supply all the demands made by the service providers 506(1)-506(6). Thus, for 1, beam 1 is active to serve service providers 506(1)-506(4), and beam 6 is active to serve service provider 506(6). In τ2, beam 1 is active to finish serving service providers 506(1)-506(4) as well as add in service providers 506(5) and 506(6). Service provider 506 (6) is done with beam 6, so beam 6 is turned off. In τ2, service providers 506(1)-506(4) begin use of beam 2, so beam 2 is turned on. This sequential turning off and on of the beams can be seen in the bottom row 554. In this fashion, all the service providers 506(1)-506(6) are served through just the two antenna panels 504A, 504B. Note that in this example there are no instances where a single panel transmits on two beams simultaneously. However, the present disclosure does contemplate that panels may be capable of transmitting two beams simultaneously. Moreover, in the case of multiple simultaneous beam capabilities of the panels, multiple beam service can be provided to several operators in parallel, according to the number of beams supported by a single panel.

By way of examples for different systems (again using six operators as the basis for the example) such as analog, fully digital, or hybrid beamforming panels, it should be appreciated that there are only two "building blocks" in each case. The precise nature of the building block may vary according to the technology. Thus, assuming the technology is an analog beamforming panel, single beam service for each operator may be effectuated by two building blocks. Assuming the building block is a fully digital or a hybrid beamforming panel that is capable of two simultaneous beams from one panel, then two simultaneous beams for each operator may still be provided with two building blocks. As more simultaneous beams are required, the building block may change to support more simultaneous beams, but the number of building blocks does not have to increase.

Figure 6A:
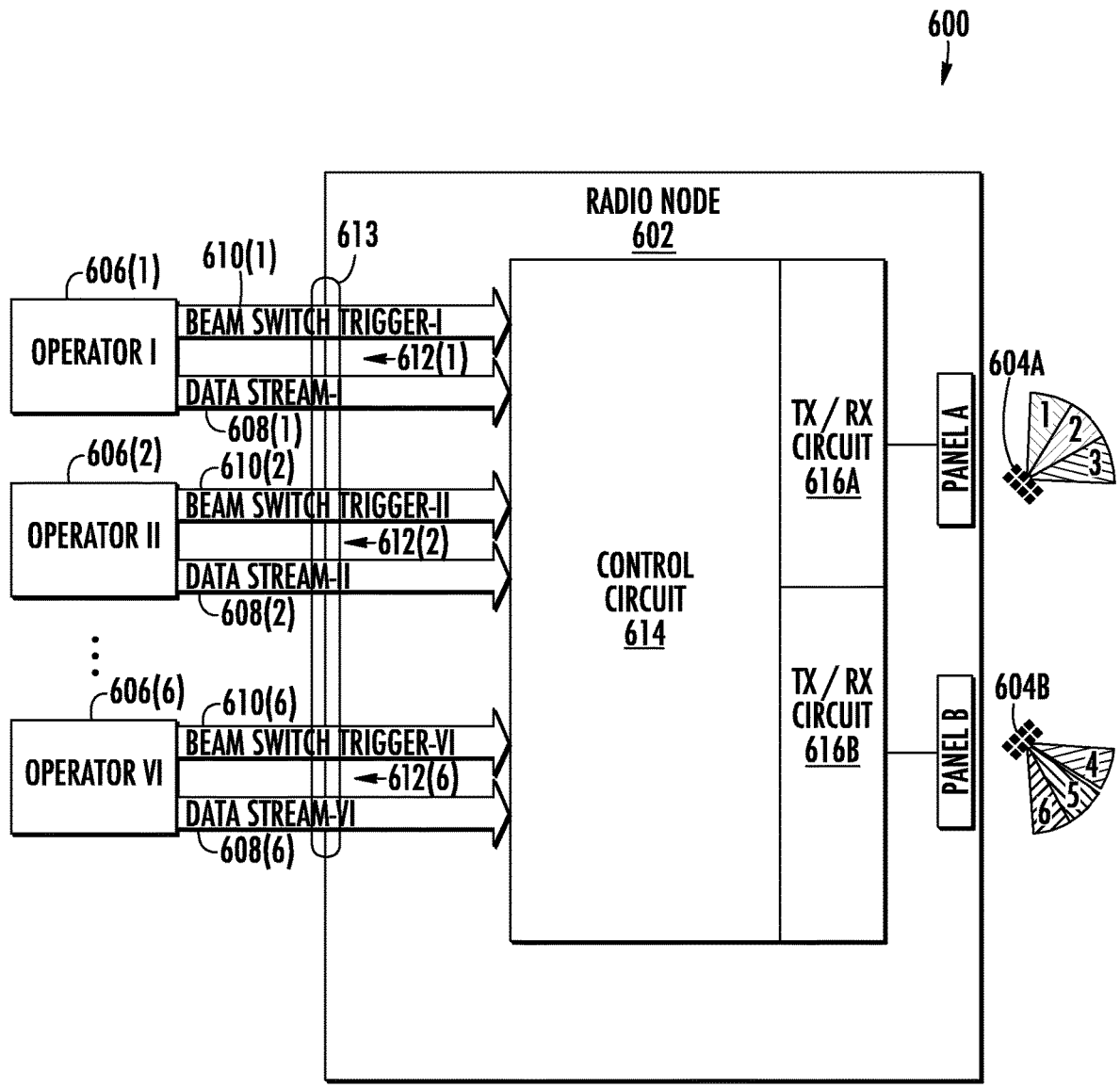
FIG. 6A is a schematic diagram of an exemplary communication system that includes a multi-operator radio node having two shared antenna arrays like that of FIG. 5A, but wherein the antenna arrays are tilted relative to one another to provide easier beamforming.

While the communication system 500 is well suited to simplify circuit and antenna panel requirements, there may be further refinements which provide even greater improvements. In this regard, FIG. 6A illustrates a communication system 600 with a multi-operator radio node 602 coupled to two common antenna panels 604A and 604B, both of which may be a MAA. The radio node 602 is similar to the radio node 502 of FIG. 5. The multi-operator radio node 602 is a circuit that includes RF front end signal processing circuits and at least a portion of the stack layer of base stations (e.g., eNodeBs, gNodeBs) for the multiple service providers supported. In the communication system 600 in FIG. 6A, six service providers 606(1)-606(6) (also referred to as operators I-VI) communicate with the radio node 602, sending respective data streams 608(1)-608(6) (generically data stream 608) and beam switch trigger signals 610(1)-610(6) (generically beam switch trigger signal 610) to the radio node 602. The beam switch trigger signals 610(1)-610(6) may have instructions for the radio node 602 as to which beam and frequency are to be used to allow a given wireless device (e.g., a cell phone) in the general service area of the radio node 602 to communicate with the network of the respective service provider 606(1)-606(6).

With continued reference to FIG. 6A, the radio node 602 receives the data streams 608(1)-608(6) and beam switch trigger signals 610(1)-610(6) at respective input communication ports 612(1)-612(6) in an input interface 613. The input communication ports 612(1)-612(6) are coupled to a control circuit 614. The control circuit 614 is coupled to the antenna panels 604A and 604B through respective transmitter circuits 616A and 616B. Again, while the present discussion focuses on the transmissions from the radio node 602, it should be appreciated that comparable circuitry and antenna panels (not shown) may be provided to handle received signals.

With continued reference to FIG. 6A, the radio node 602 has the antenna panel 604A tilted relative to antenna panel 604B, and the signal beams are more tightly clustered compared to the signal beams of the antenna panels 504A and 504B (e.g., the first antenna panel 604A has beams 1-3 and the second antenna 604B has beams 4-6 instead of 1, 3, 5/2, 4, 6). By clustering the beams such that they are more generally perpendicular to a front face of the panel (i.e., a relatively small steering angle), the quality of beam is better from a gain point of view in a desired direction and there is less emission in undesired directions. That is, just as it is easier to not have to make beams 1 and 6 with the same panel, by clustering the beams, it is easier to not have to make beams 1 and 5. Said another way, the smaller the required steering angle and the more closely clustered the steering angle is made perpendicular to a front face of the panel, the better the quality of the beam. Likewise, as the steering angle is increased, the quality of the beam is reduced. The desired coverage area is still served by the hypothetical beams 1-6, but the circuitry for the antenna panels 604A, 604B is further simplified compared to antenna panels 504A, 504B. Moreover, if the panel is designed to use only low steering angles, antenna elements could be built in advance to improve the beam quality and antenna gain above any gains that might be realized by an antenna panel that is generically designed to provide a large steering angle.

Figure 6B:
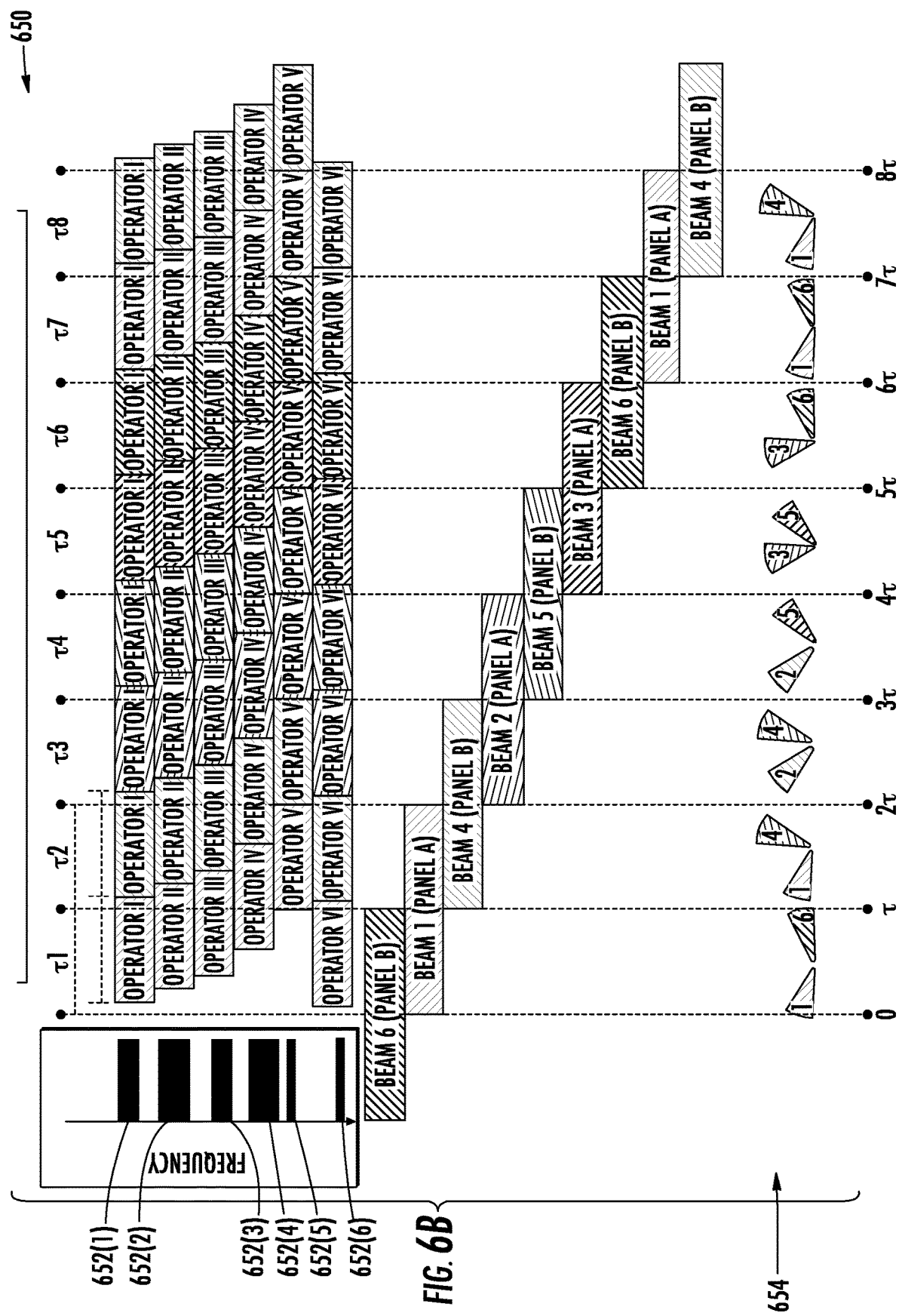
FIG. 6B is a stylized time diagram showing how multiple operators use the paired antenna arrays of FIG. 6A to provide full coverage.

To assist in understanding the arbitration of the control circuit 614, FIG. 6B shows an exemplary time diagram 650 that shows a beam usage based on hypothetical signals from the service providers 606(1)-606(6). It should be appreciated that the service providers 606(1)-606(6) are not synchronized relative to one another. For the sake of example, it is assumed that the service providers are operating on different frequencies 652(1)-652(6) and proceed through different beams. However, the control circuit 614 can determine a window τ, in which two beams may be active and supply all the demands made by the service providers. Thus, for τ1, beam 1 is active to serve service providers 606(1)-606(4) and beam 6 is active to serve service provider 606(6). In τ2, beam 1 is active to finish serving service providers 606(1)- 606(4) as well as add in service providers 606(5) and 606(6). Service provider 606(6) is done with beam 6, so beam 6 is turned off. In τ2, service providers 606(1)-606(4) begin use of beam 4, so beam 4 is turned on. This sequential turning off and on of the beams can be seen in the bottom row 654. In this fashion, all the service providers 606(1)-606(6) are served through just the two antenna panels 604A, 604B. Again, note that in this example there are no instances where a single panel transmits on two beams simultaneously. However, the present disclosure does contemplate that panels may be capable of transmitting two beams simultaneously.

Figure 7:
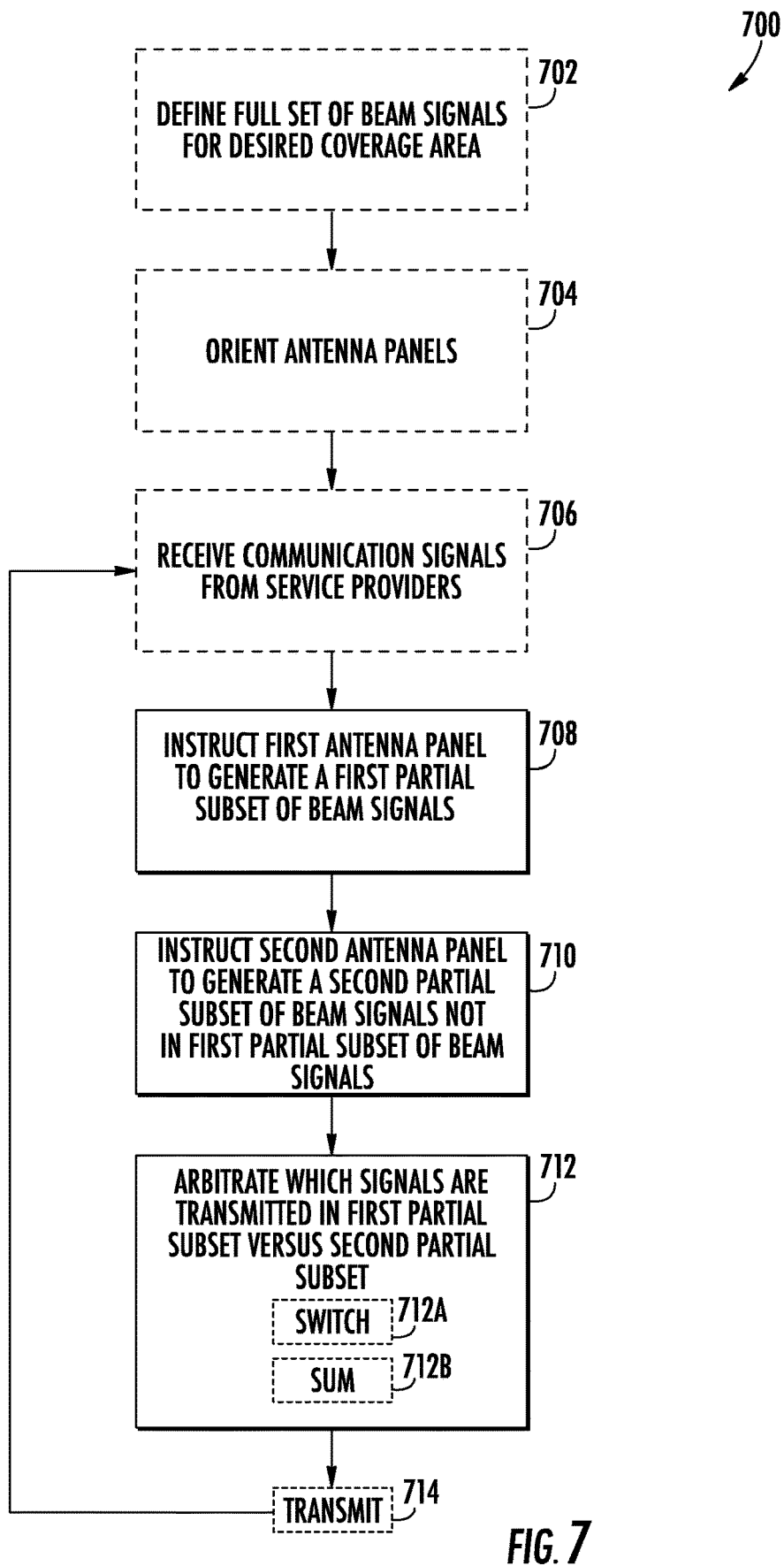
FIG. 7 is a flowchart illustrating an exemplary process of the multi-operator radio node in the communication systems in FIG. 5A or FIG. 6A collating signals from multiple operators and using beams selectively from the paired antennas to provide wireless signals to a service area.
Figure 9:
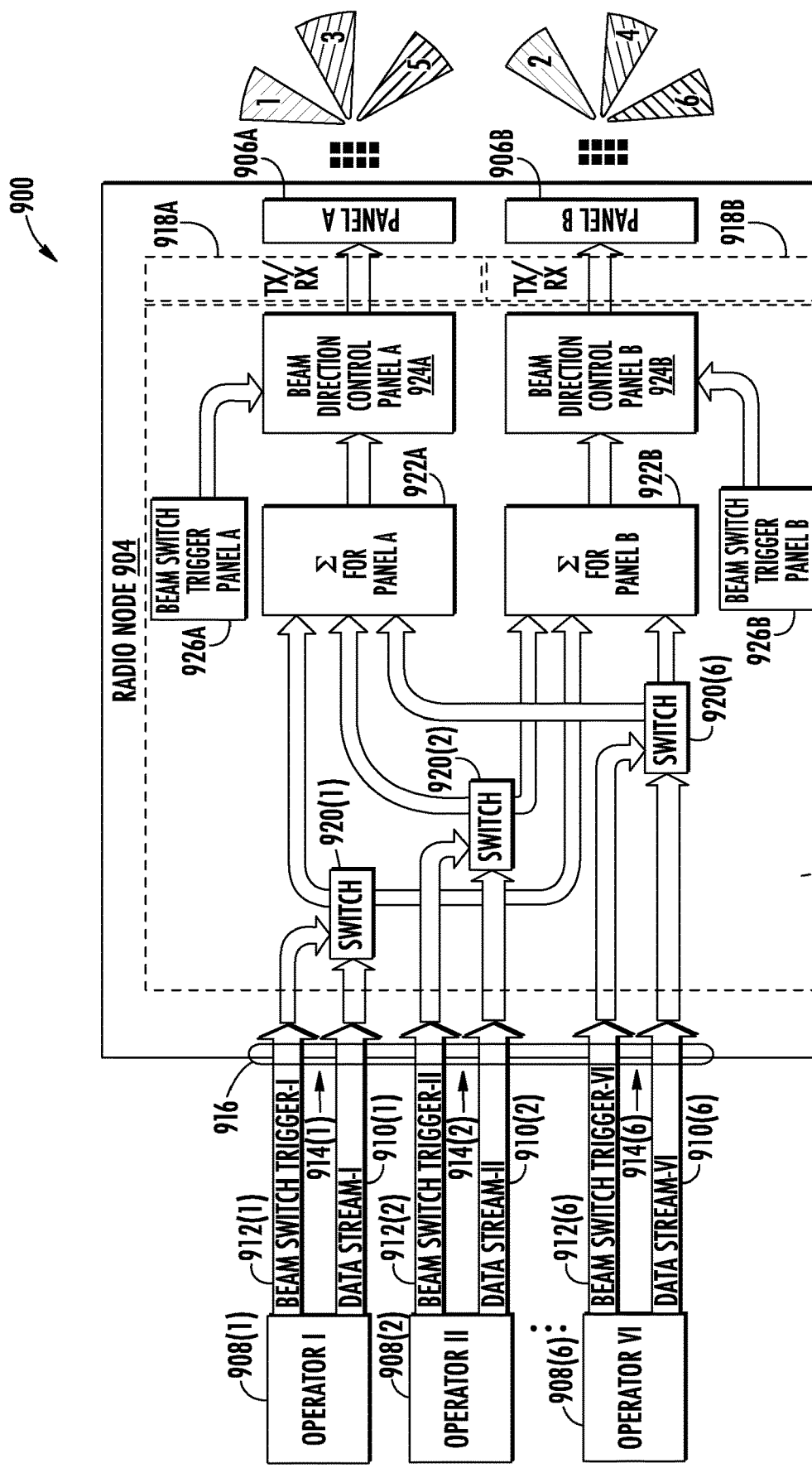
FIG. 9 is a more detailed schematic diagram of an exemplary communication system that includes a multi-operator radio node having two shared antenna arrays that both serve all the operators by providing only selected beams from each of the antenna arrays such that full coverage is still supplied without needing a full transmit circuit for each operator.

FIG. 7 provides a flowchart of a process 700 associated with using the antenna panels and radio nodes of the present disclosure. Before use, the antenna panels must be installed or deployed. Thus, before the process 700 properly begins, a designer may define a full set of beam signals for a desired coverage area (block 702). The set of beam signals serves an area defined in part by an origin angle, where the origin angle is the angle swept by the full set of beam signals. For the sake of example, as illustrated in FIGS. 5A, 6A, and 9, the origin angle is 180 degrees. That is, the angle between the outer edge of the outer beam signal 1 and the outer edge of the outer beam signal 6 is 180 degrees. It should be appreciated that other origin angles could be used. If desired, the antenna panels are then oriented (block 704), which may include keeping them parallel to each other (e.g., the radio node 502 of FIG. 6A) or tilted relative to each other (e.g., the radio node 602 of FIG. 6A). In an exemplary aspect, the tilt relative to each other is half the origin angle.

With continued reference to FIG. 7, the process 700 of using the antenna panels and radio nodes more properly begins when the radio node receives communication signals from the service providers (block 706). Then, the control circuit of the radio node instructs the first antenna panel to generate a first partial subset of beam signals (block 708) of the full set of beam signals. Further, the control circuit of the radio node instructs the second antenna panel to generate a second partial subset of beam signals (block 710) of the full set of beam signals, where the second partial subset of beam signals is not included in the first partial subset of beam signals.

With continued reference to FIG. 7, the control circuit arbitrates which signals are transmitted in the first partial subset of beam signals and which of others of the communication signals are transmitted through the second partial subset of beam signals (block 712). This arbitration may be done through switching (block 712A) and summing (block 712B) as better explained below with reference to FIG. 9. Finally, the radio node transmits the communication signals through the antenna panels (block 714). Note that the process returns to block 706, although it should be appreciated that the process is continuous in that new signals are received concurrently with the active transmissions.

Figure 8A:
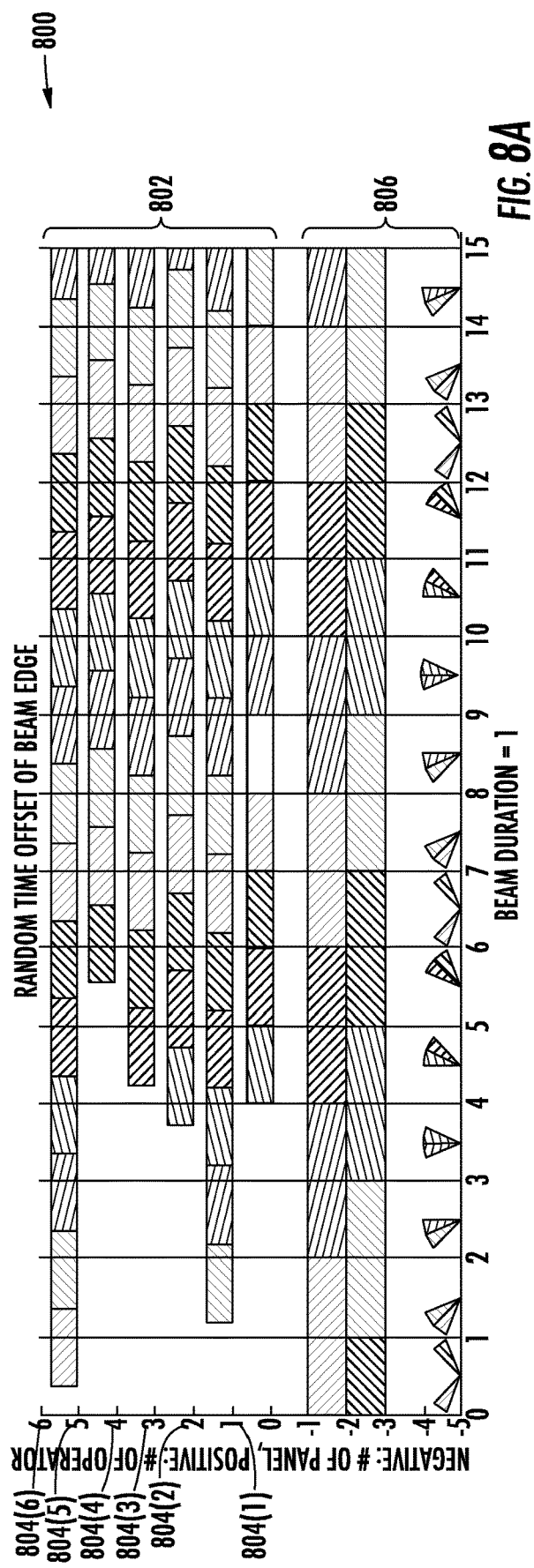
FIG. 8A is a time diagram like that of FIG. 5B or FIG. 6B but with randomized operator signals showing that even under non-stylized situations, full coverage may still be provided with two antenna arrays shared between multiple operators.
Figure 8B:
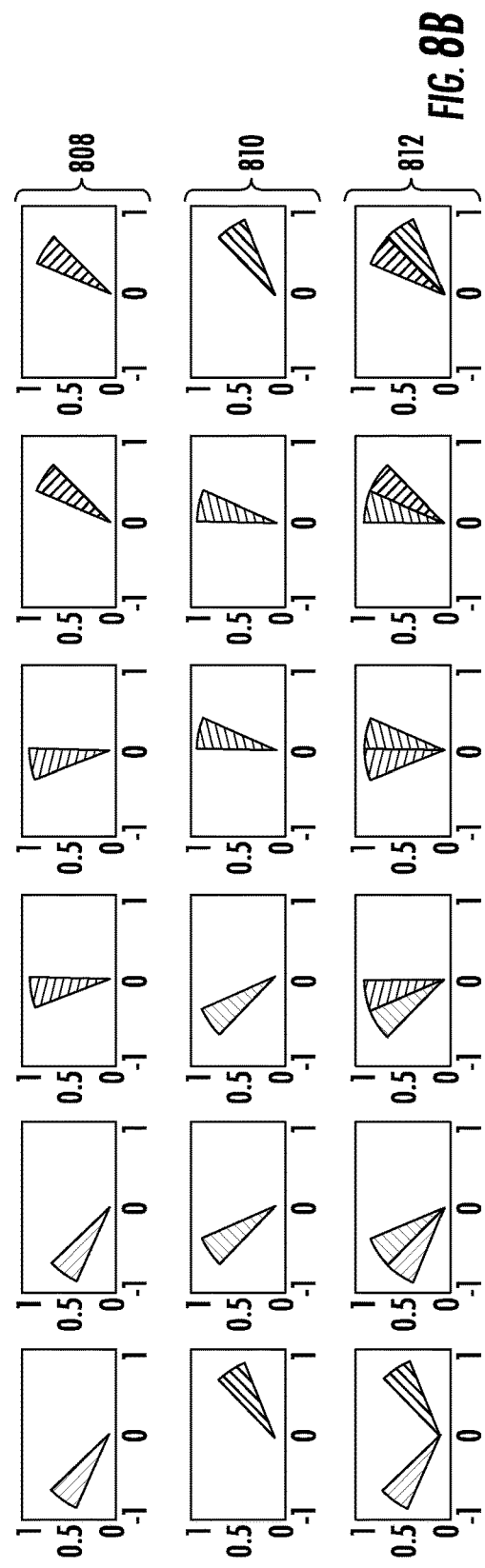
FIG. 8B is a time diagram showing beam sequences for the respective antenna arrays used in the time diagram of FIG. 8A where the top row is the left antenna array, the middle row is the right antenna array, and the bottom row is both antenna arrays.

The time diagrams 550 and 650 of FIGS. 5B and 6B are hypothetical in that they assume a regular, orderly change in communication signals from the service providers. However, exemplary aspects of the present disclosure are robust enough to handle completely random communication signals from the service providers. FIGS. 8A and 8B show a time diagram 800 where a section 802 of the timing diagram 800 shows operators 804(1)-806(6) corresponding to the service providers 506(1)-506(6) with their beam requirements. Section 806 shows which panel is used by the signal requirements from the operators 804(1)-804(6). FIG. 8B shows in row 808, what beam from the first antenna panel 504A is used, row 810 shows what beam from the second antenna panel 504B is used, and row 812 shows the beams from the combined antenna panels 504A, 504B. Again, note that in this example there are no instances where a single panel transmits on two beams simultaneously. However, the present disclosure does contemplate that panels may be capable of transmitting two beams simultaneously.

FIG. 9 illustrates a communication system 900 that is similar to the communication system 500 of FIG. 5A, but illustrates more details about the control circuit 902 within the radio node 904. As with the radio node 502, the radio node 904 includes two common antenna panels 906A and 906B, both of which may be a MAA. In the communication system 900 in FIG. 9, six service providers 908(1)-908(6) (also referred to as operators I-VI) communicate with the radio node 904, sending respective data streams 910(1)-910(6) (generically data stream 910) and beam switch trigger signals 912(1)-912(6) (generically beam switch trigger signal 912) to the radio node 904.

With continued reference to FIG. 9, the radio node 904 receives the data streams 910(1)-910(6) and beam switch trigger signals 912(1)-912(6) at respective input communication ports 914(1)-914(6) in an input interface 916. The input communication ports 914(1)-914(6) are coupled to the control circuit 902. The control circuit 902 is coupled to the antenna panels 906A and 906B through respective transmitter circuits 918A and 918B.

With continued reference to FIG. 9, the control circuit 902 includes switches 920(1)-920(6) which route the respective data streams 910(1)-910(6) to summation circuits 922A or 922B based on the beam switch trigger signals 912(1)-912(6). Summation circuit 922A outputs a first output signal to a beam direction control panel circuit 924A that is controlled by a beam switch trigger panel circuit 926A. Similarly, summation circuit 922B outputs a second output signal to a beam direction control panel circuit 924B that is controlled by a beam switch trigger panel circuit 926B. In particular, the beam switch trigger panel circuits 926A and 926B determine which beams are needed and cause the beam direction control panel circuits 924A and 924B to activate the appropriate beams at the appropriate times.

Figure 10:
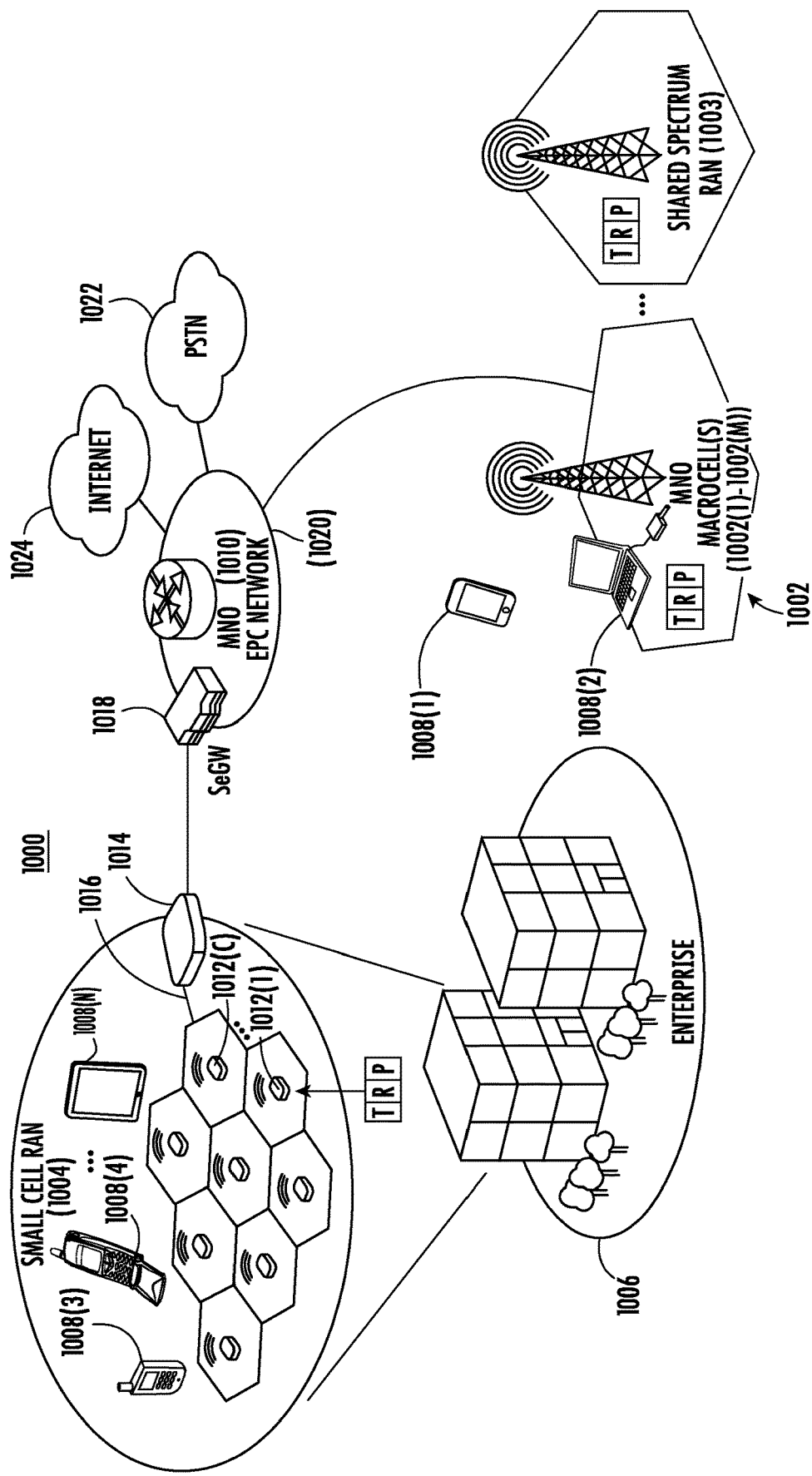
FIG. 10 is a schematic diagram of an exemplary mobile telecommunication environment that includes an exemplary macrocell radio access network (RAN) and an exemplary small cell RAN employing a multi-operator radio node located within an enterprise environment and configured to service mobile communication between a user mobile communication device to a mobile network operator (MNO), wherein the multi-operator radio node is configured to combine signal streams of the spectrum of the service providers directed to the same antenna element in the antenna array to form signal beams in individual spectrum layers of the service providers.

Multi-operator radio nodes configured to be coupled to a common antenna array and configured to combine signal streams of the spectrum of the service providers directed to the same antenna element in the antenna array to form signal beams in individual frequency ranges of the service providers and the communication circuits disclosed herein, including, but not limited to, the multi-operator radio nodes 502, 602, and 904 in FIGS. 5A, 6A, and 9 can also be employed in different types of communication systems that provide a radio access network (RAN), including, but not limited to, macrocell systems, small cell systems, remote radio heads (RRH) systems, etc. For example, FIG. 10 is a schematic diagram of an exemplary mobile telecommunication environment 1000 (also referred to as "environment 1000") that includes exemplary macrocell RANs 1002(1)-1002(M) ("macrocells 1002(1)-1002(M)") and an exemplary small cell RAN 1004 located within an enterprise environment 1006 and configured to service mobile communication between a user mobile communication device 1008(1)-1008(N) to a mobile network operator (MNO) 1010. A serving RAN for a user mobile communication device 1008(1)-1008(N) is a RAN or cell in the RAN in which the user mobile communication devices 1008(1)-1008(N) have an established communication session with the exchange of mobile communication signals for mobile communication. Thus, a serving RAN may also be referred to herein as a serving cell. For example, the user mobile communication devices 1008 (3)-1008(N) in FIG. 10 are being serviced by the small cell RAN 1004, whereas user mobile communication devices 1008(1) and 1008(2) are being serviced by the macrocell 1002. The macrocell 1002 is an MNO macrocell in this example. However, a shared spectrum RAN 1003 (also referred to as "shared spectrum cell 1003") includes a macrocell in this example and supports communication on frequencies that are not solely licensed to a particular MNO and thus may service user mobile communication devices 1008(1)-1008(N) independent of a particular MNO. For example, the shared spectrum cell 1003 may be operated by a third party that is not an MNO and wherein the shared spectrum cell 1003 support citizens broadband radio service (CBRS). Also, as shown in FIG. 10, the MNO macrocell 1002, the shared spectrum cell 1003, and the small cell RAN 1004 can include multi-operator radio nodes, such as the multi-operator radio nodes 502, 602, and 904 in FIGS. SA, 6A, and 9. The MNO macrocell 1002, the shared spectrum cell 1003, and the small cell RAN 1004 may be neighboring radio access systems to each other, meaning that some or all can be in proximity to each other such that a user mobile communication device 1008(3)-1008(N) may be able to be in communication range of two or more of the MNO macrocell 1002, the shared spectrum cell 1003, and the small cell RAN 1004 depending on the location of user mobile communication devices 1008(3)-1008(N). In FIG. 10, the mobile telecommunication environment 1000 in this example, is arranged as an LTE (Long Term Evolution) system as described by the Third Generation Partnership Project (3GPP) as an evolution of the GSM/UMTS standards (Global System for Mobile communication/Universal Mobile Telecommunication System). It is emphasized, however, that the aspects described herein may also be applicable to other network types and protocols. The mobile telecommunication environment 1000 includes the enterprise 1006 in which the small cell RAN 1004 is implemented. The small cell RAN 1004 includes a plurality of small cell radio nodes (RNs) 1012(1)-1012(C). Each small cell radio node 1012(1)-1012(C) has a radio coverage area (graphically depicted in the drawings as a hexagonal shape) that is commonly termed a "small cell." A small cell may also be referred to as a femtocell, or using terminology defined by 3GPP as a Home Evolved Node B (HeNB). In the description that follows, the term "cell" typically means the combination of a radio node and its radio coverage area unless otherwise indicated. In FIG. 10, the small cell RAN 1004 includes one or more services nodes (represented as a single services node 1014) that manage and control the small cell radio nodes 1012(1)-1012(C). In alternative implementations, the management and control functionality may be incorporated into a radio node, distributed among nodes, or implemented remotely (i.e., using infrastructure external to the small cell RAN 1004). The small cell radio nodes 1012(1)-1012(C) are coupled to the services node 1014 over a direct or local area network (LAN) connection 1016 as an example, typically using secure IPsec tunnels. The small cell radio nodes 1012(1)-1012(C) can include multi-operator radio nodes, such as the multi-operator radio nodes 502, 602, and 904 in FIGS. 5A, 6A, and 9. The services node 1014 aggregates voice and data traffic from the small cell radio nodes 1012(1)-1012(C) and provides connectivity over an IPsec tunnel to a security gateway (SeGW) 1018 in a network 1020 (e.g, EPC network in a 4G network, or 5G Core in a 5G network) of the MNO 1010. The network 1020 is typically configured to communicate with a public switched telephone network (PSTN) 1022 to carry circuit-switched traffic, as well as for communicating with an external packet-switched network such as the Internet 1024.

The environment 1000 also generally includes a node (e.g., eNodeB or gNodeB) base station, or "macrocell" 1002. The radio coverage area of the macrocell 1002 is typically much larger than that of a small cell where the extent of coverage often depends on the base station configuration and surrounding geography. Thus, a given user mobile communication device 1008(3)-1008(N) may achieve connectivity to the network 1020 (e.g, EPC network in a 4G network, or 5G Core in a 5G network) through either a macrocell 1002 or small cell radio node 1012(1)-1012(C) in the small cell RAN 1004 in the environment 1000.

Figure 11:
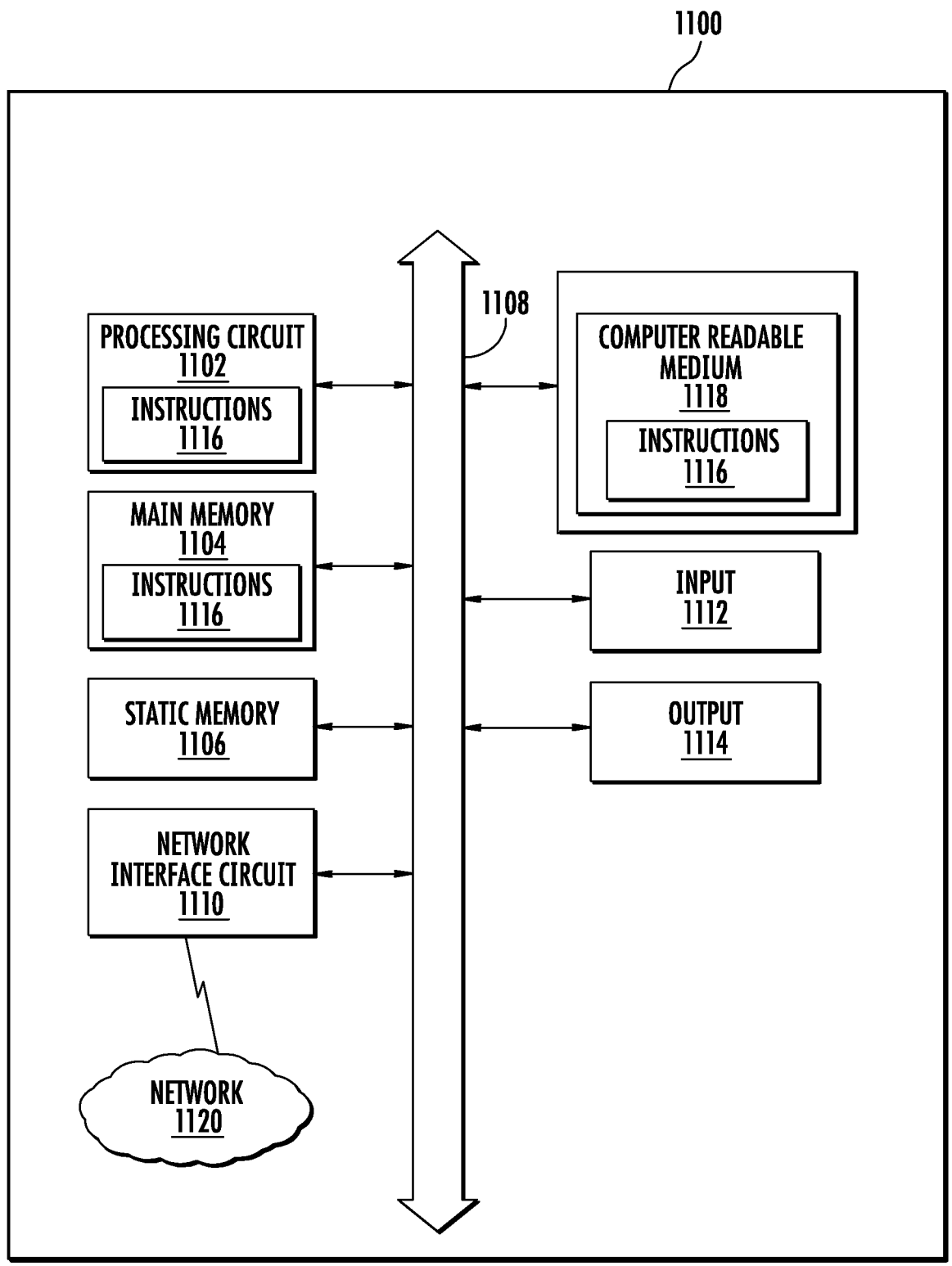
FIG. 11 is a schematic diagram of a representation of an exemplary computer system that can be included in or interface with any of the multi-operator radio nodes and/or signal processing circuits therein, including the multi-operator radio nodes in FIGS. 5A, 6A, and 9, wherein the exemplary computer system is adapted to execute instructions from an exemplary computer-readable media.

Any of the multi-operator radio nodes 502, 602, and 904 in FIGS. 5A, 6A, and 9 and their circuits can include a computer system 1100, such as shown in FIG. 11. With reference to FIG. 11, the computer system 1100 includes a set of instructions for causing the multi-operator radio node component(s) to provide its designed functionality, including any of the functionality of the multi-operator radio nodes 502, 602, and 904 in FIGS. 5A, 6A, and 9, and their circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1100 in this embodiment includes a processing device or processor 1102, a main memory 1104 (e.g., read-only memory (ROM), flash memory, dynamic random access memory (DRAM) such as synchronous DRAM (SDRAM), etc.), and a static memory 1106 (e.g., flash memory, static random access memory (SRAM), etc.), which may communicate with each other via a data bus 1108. Alternatively, the processing device 1102 may be connected to the main memory 1104 and/or static memory 1106 directly or via some other connectivity means. The processing device 1102 may be a controller, and the main memory 1104 or static memory 1106 may be any type of memory.

The processing device 1102 represents one or more general-purpose processing devices such as a microprocessor, central processing unit, or the like. More particularly, the processing device 1102 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1102 is configured to execute processing logic in instructions 1116 for performing the operations and steps discussed herein.

The computer system 1100 may further include a network interface circuit 1110. The computer system 1100 also may or may not include an input 1112 to receive input and selections to be communicated to the computer system 1100 when executing instructions. The computer system 1100 also may or may not include an output 1114, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 1100 may or may not include a data storage device that includes instructions 1116 stored in a computer-readable medium 1118. The instructions 1116 may also reside, completely or at least partially, within the main memory 1104 and/or within the processing circuit 1102 during execution thereof by the computer system 1100, the main memory 1104 and the processing circuit 1102 also constituting computer-readable medium. The instructions 1116 may further be transmitted or received over a network 1120 via the network interface circuit 1110.

While the computer-readable medium 1118 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A node for providing wireless communication services for a plurality of service providers to a service area with a defined set of beam signals, the node comprising:
    a plurality of input communication ports configured to receive communication signals from the plurality of service providers;
    a first antenna panel;
    a second antenna panel; and
    a control circuit coupled to the plurality of input communication ports, the first antenna panel, and the second antenna panel, the control circuit configured to:
        instruct the first antenna panel to generate a first partial subset of beam signals of the defined set of beam signals;
        instruct the second antenna panel to generate a second partial subset of beam signals of the defined set of beam signals, wherein the second partial subset of beam signals does not include beam signals from the first partial subset of beam signals; and
        arbitrate, by finding a window of a required beam duration in which two beams may be active and meet demands of the plurality of service providers despite asynchronous behavior and different frequencies across the plurality of different service providers, which of the communication signals from the plurality of service providers are transmitted through the first partial subset of beam signals and which of others of the communication signals from the plurality of service providers are transmitted through the second partial subset of beam signals.

2. The node of claim 1, wherein the control circuit comprises:
    a plurality of switches coupled to respective ones of the plurality of input communication ports.

3. The node of claim 2, wherein the control circuit comprises:
    a first summation circuit coupled to the plurality of switches and configured to sum the communication signals received from the plurality of service providers to provide a first output signal; and
    a second summation circuit coupled to the plurality of switches and configured to sum the communication signals received from the plurality of service providers to provide a second output signal.

4. The node of claim 3, wherein the control circuit comprises:
    a first beam direction control panel circuit coupled to the first summation circuit; and
    a second beam direction control panel circuit coupled to the second summation circuit.

5. The node of claim 4, wherein the control circuit comprises:

a first beam switch trigger panel circuit coupled to the first beam direction control panel circuit and configured to control the first beam direction control panel circuit; and a second beam switch trigger panel circuit coupled to the second beam direction control panel circuit configured to control the second beam direction control panel circuit.

6. The node of claim 1, wherein the defined set of beam signals serves an area defined in part by an origin angle.

7. The node of claim 6, wherein the origin angle is less than or equal to 180 degrees in at least one of the azimuthal or elevational directions.

8. The node of claim 6, wherein the first antenna panel is tilted relative to the second antenna panel.

9. The node of claim 8, wherein the first antenna panel is tilted relative to the second antenna panel by half the origin angle.

10. The node of claim 1, wherein the node comprises a radio remote unit.

11. The node of claim 1, wherein the node comprises a distributed unit.

12. The node of claim 1, wherein the node comprises an end unit.

13. A method for controlling a node for providing wireless communication services for a plurality of service providers to a service area with a defined set of beam signals, the method comprising:

instructing a first antenna panel to generate a first partial subset of beam signals of the defined set of beam signals;

instructing a second antenna panel to generate a second partial subset of beam signals of the defined set of beam signals, wherein the second partial subset of beam signals does not include beam signals from the first partial subset of beam signals; and arbitrating by finding a window of a required beam duration in which two beams may be active and meet demands of the plurality of service providers despite asynchronous behavior and different frequencies across the plurality of different service providers, which of communication signals from the plurality of service providers are transmitted through the first partial subset of beam signals and which of others of the communication signals from the plurality of service providers are transmitted through the second partial subset of beam signals.

14. The method of claim 13, further comprising receiving, at a plurality of input communication ports, the communication signals from the plurality of service providers.

15. The method of claim 13, further comprising transmitting from the first antenna panel with at least one beam signal from the first partial subset of beam signals and simultaneously transmitting from the second antenna panel with at least one beam signal from the second partial subset of beam signals.

16. The method of claim 13, further comprising switching incoming communication signals from the plurality of service providers to respective summation circuits associated with the first and second antenna panels.

17. The method of claim 16, further comprising summing certain ones of the incoming communication signals from the plurality of service providers with the respective summation circuits based on the switching.

18. A multi-operator radio node for providing wireless communication services for a plurality of service providers to a service area with a defined set of beam signals, the multi-operator radio node comprising:

a plurality of input communication ports configured to receive communication signals from the plurality of service providers;

a first antenna panel;

a second antenna panel; and a control circuit coupled to the plurality of input communication ports, the first antenna panel, and the second antenna panel, the control circuit comprising a plurality of switches, a first summation circuit, and a second summation circuit, the control circuit configured to:

instruct the first antenna panel to generate a first partial subset of beam signals of the defined set of beam signals;

instruct the second antenna panel to generate a second partial subset of beam signals of the defined set of beam signals, wherein the second partial subset of beam signals does not include beam signals from the first partial subset of beam signals; and arbitrate, by finding a window of a required beam duration in which two beams may be active and meet demands of the plurality of service providers despite asynchronous behavior and different frequencies across the plurality of different service providers, which of the communication signals from the plurality of service providers are transmitted through the first partial subset of beam signals and which of others of the communication signals from the plurality of service providers are transmitted through the second partial subset of beam signals, wherein the defined set of beam signals serves an area defined in part by an origin angle of less than or equal to 180 degrees in at least one of the azimuthal or elevational directions.

19. The multi-operator node of claim 18, wherein the control circuit comprises:

a first beam direction control panel circuit coupled to the first summation circuit; and a second beam direction control panel circuit coupled to the second summation circuit.

20. The node of claim 19, wherein the first antenna panel is tilted relative to the second antenna panel.

* * * * *

UNITED STATES PATENT AND TRADEMARK OFFICE
CERTIFICATE OF CORRECTION

PATENT NO. : 11,736,953 B2  
APPLICATION NO. : 16/587990  
DATED : August 22, 2023  
INVENTOR(S) : Benjamin Imanilov et al.

Page 1 of 1

It is certified that error appears in the above-identified patent and that said Letters Patent is hereby corrected as shown below:

On the Title Page

On the page 2, in Column 1, under Item (56) "Other Publications", Line 8, delete "Satelite" and insert -- Satellite --.

In the Claims

In Column 18, Lines 37-42, in Claim 18, delete "signals from the plurality of service providers are transmitted through the first partial subset of beam signals and which of others of the communication signals from the plurality of service providers are transmitted through the second partial subset of beam signals, wherein" and insert the same on Column 18 Line 36 as a continuation of the same paragraph.

Signed and Sealed this  
Twenty-sixth Day of December, 2023

Katherine Kelly Vidal  
*Director of the United States Patent and Trademark Office*